Patented Feb. 13, 1951

2,541,498

UNITED STATES PATENT OFFICE 2,541,498

POLYETHYLENE AS A LINER FOR TACKY RUBBER

William D. Calvert, Cuyahoga Falls, Ohio, assignor to The B. F. Goodrich Company, New York, N. Y., a corporation of New York No Drawing. Application January 29, 1948, Serial No. 5,177

8 Claims. (Cl. 206—59)

This invention relates to a method and means for protecting the surface of normally tacky bodies and is particularly concerned with means for covering the surfaces of unvulcanized rubber material until such time as the material is ready for vulcanization.

Unvulcanized rubbery compositions which include a vulcanizable rubber and compounding ingredients therefor normally are characterized by a somewhat tacky surface. The degree of tackiness will vary somewhat from one composition to another depending upon the length of time the composition is masticated and the amount of softeners or tackifying agents used in the recipe. In any case, however, the surface of such a composition is somewhat tacky and the surface exhibits pressure-sensitive characteristics so that the adhesive properties of the surface increase with increasing pressure thereon.

This surface tackiness causes unvulcanized articles to adhere together if they are not insulated by a non-adhering material and also causes foreign material to adhere to the surface. It is necessary, therefore, that unvulcanized articles be covered with a suitable non-adherent material during storage. In the manufacture of complex articles such as tires or hose which are built up from a number of layers of calendered rubber sheet or rubber-coated fabric, the surface tack of the unvulcanized rubber is employed to obtain preliminary adhesion of the various elements prior to vulcanization. In such case, it is essential that the protective material used to prevent adhesion of the surfaces of these elements during storage and before final use be readily removable from the surfaces to leave them clean and suitable for use in the building operation.

It has been common practice to use such materials as parchment paper, holland cloth or similar sheet material as liner layers between sheets of rubbery material or to coat the surface of rubbery articles with such particulate materials as talc, soapstone, mica, etc., in order to prevent premature and undesired adhesion of the surfaces.

Such sheet liner materials cannot be salvaged or reworked, however, if they become torn or damaged in any way. Particulate material, on the other hand, becomes embedded in the rubber surface and cannot readily be removed before vulcanization.

It is, therefore, an object of this invention to provide means for temporarily protecting the exposed surfaces of bodies of unvulcanized rubbery material, which means will adhere to the surface sufficiently to be held in position during storage or shipment but which may be readily stripped from the rubbery surface leaving the surface intact. It is a further object of the invention to provide covering means which may be used repeatedly and which may be reworked into a usable condition if it becomes torn, damaged or soiled. Another object of the invention is to provide a covering material which is compatible with rubber and which may be blended therein. Other objects will be apparent from the description which follows.

I have discovered that a suitable covering means for unvulcanized rubber articles consists of a continuous relatively thin sheet or film comprising polyethylene. Polyethylene may be readily formed into sheets having tack-free surfaces, the sheets being continuous and impervious to dirt, oils, greases and similar contaminants. The polyethylene films when pressed into contact with a tacky rubber surface adhere to the surface but they may be readily stripped therefrom without injuring the rubber surface. The polyethylene sheets may be reformed if they become damaged and can thus be used repeatedly. If desired, the rubbery composition having polyethylene film disposed on the surface may be processed further as by further mastication, extrusion etc., without removal of the polyethylene film therefrom, since the polyethylene blends completely with all types of natural and synthetic rubber, and in amounts of less than 20% by weight based on the weight of the rubber it does not deleteriously affect the properties of the composition.

The polyethylene used in practising this invention comprises those solid polymers having the structure $(CH_2)_x$ and a molecular weight above 6000. Polyethylene is generally prepared by polymerizing ethylene at a pressure above 500 atmospheres and a temperature above 100° C., the polymerization preferably being carried out at pressures of 1000–3000 atmospheres and temperature of 100–400° C., or desirably 150–250° C., using 0.01%–0.10% of oxygen by weight based on the weight of ethylene as a catalyst.

The polyethylene may be milled or calendered into sheets of the desired thickness, films of 0.001–0.01″ thickness being preferably used although the film may be as thick as 0.05″ or thicker if desired, or the film may be formed by extruding and expanding a tube thereof which is slit longitudinally to form a sheet. The film preferably consists of unplasticized polyethylene but polyethylene which has been plasticized with fatty acid or similar plasticizer therefor may be used. The polyethylene may also contain other compounding ingredients therefor such as fillers, stabilizers, etc., in accordance with known compounding practices. In some cases, it is desirable to use dyed or colored film so that the presence of a polyethylene film on a rubbery surface may be readily detected and the film stripped off before the rubbery composition is used.

The film may be used in combination with a body of any normally tacky composition but is preferably used to cover the surface of unvulcanized compositions which include a vulcanizable rubber. Such vulcanizable rubbers include any rubber, whether natural or synthetic, which may be vulcanized by means of sulfur, sulfides, oxides or similar vulcanizing agents. The natural rubbers include, for example, such rubbers as caoutchouc, balata, gutta-percha, and similar naturally occuring rubbers. The synthetic rubbers which may be used include, for example, the rubbery polymers of butadiene-1,3 and similar conjugated dienes, chloroprene, isobutylene, isoprene or similar polymerizable monomers as well as interpolymers of these or similar monomers with each other or with monomers copolymerizable therewith such as styrene, acrylonitrile, methyl acrylate, methyl methacrylate, ethyl acrylate, ethyl methacrylate or similar monomeric materials.

The rubbery composition may include in addition to the vulcanizable rubber, any of the commonly employed compounding ingredients for such rubber in the amounts and proportions commonly employed in rubber compounding practice. Such other ingredients may include, for example, any of the well-known vulcanizing agents and accelerators therefor, antioxidants, fillers, softeners, reinforcing agents, color pigments, etc.

In practicing the invention, a sheet or article is formed from the desired vulcanizable composition. A film of polyethylene adapted to cover the surface extent of the rubbery body is disposed on the body in facewise contact therewith and pressed against the tacky surface of the body causing the film to adhere to the pressure-sensitive surface thereof. In this condition, the unvulcanized articles may be stacked for extended periods of time without adhering to each other or may be shipped without danger of contamination.

When the body of rubbery material is to be processed further, such as being vulcanized, molded or extruded, the film of polyethylene is preferably stripped from the surface of the body, leaving the surface intact and free from foreign matter.

For example, in the case of a sheet of vulcanizable rubber composition or of fabric coated therewith, polyethylene film may be applied to one surface of the material as it comes from the calender. The material may then be rolled upon a drum or other support, the polyethylene film serving to separate and prevent adhesion of adjacent rubber surfaces. The polyethylene film may readily be stripped from the surface of the material as it is unrolled from the drum for further treatment or use.

The polyethylene film may be used again without change or may be heated to 200–300° F. and sheeted out again. The polyethylene having a tack-free surface does not tear in stripping from the rubber, nor does it contaminate the rubber surface.

If desired, a supported film of polyethylene may be used as a surface covering. Thus the polyethylene may be calndered on or otherwise laminated with textile fabric reinforcement, preferably a loosely woven fabric of low tear resistance such as cheesecloth or the like. This laminate may be desirably used where somewhat greater strength is desired than that possessed by the unsupported film.

The polyethylene film may be used for covering milled or calendered sheets of unvulcanized compositions or may be used in combination with preformed articles consisting either partially or wholly of such compositions. For example, the polyethylene may be used in combination with tire or inner tube patches, adhesive tape, inner tube valves or similar articles where a protective covering for the rubbery surfaces is necessary to prevent contamination until the articles are used.

The invention has been described in detail with reference to a few preferred embodiments thereof but it will be understood that variations and modifications may be effected within the spirit and scope of the invention as defined in the appended claims.

I claim:

1. In combination with an article having an external portion of an unvulcanized composition comprising a vulcanizable rubber and a vulcanizing agent therefor, a relatively thin continuous layer comprising polyethylene having a molecular weight above 6000 disposed over the surface extent of such portion in facewise contact therewith held in place by the surface tack of said article and readily strippable therefrom.

2. In combination, a continuous calendered sheet having opposed surfaces comprising a tacky vulcanizable rubber composition and a vulcanizing agent therefor, said sheet being rolled upon itself, and a continuous preformed film of polyethylene having a molecular weight above 6000 interposed between adjacent rubber surfaces in said roll.

3. A body of an unvulcanized tacky composition including vulcanizable natural rubber and a vulcanizing agent therefor, said body having a continuous layer free from surface tackiness consisting of polyethylene having a molecular weight above 6000 disposed over substantially the extent of the surface thereof, said layer being maintained on said surface by the tackiness of said composition but readily removable therefrom leaving the surface of said body intact.

4. The method of making a vulcanizable article having associated therewith a protective means for the surface thereof, which method comprises forming said article from a normally tacky unvulcanized composition including a vulcanizable rubber and a vulcanizing agent therefor, providing a relatively thin film consisting of polyethylene having a molecular weight above 6000, disposing said film over the surface extent of said article, and pressing the film against the surface of the article to cause the film to adhere thereto.

5. The method of preventing adhesion of adjacent surfaces of tacky vulcanizable compositions comprising a vulcanizable rubber and a vulcanizing agent therefor, which method comprises interposing between said surfaces a continuous film comprising polyethylene having a molecular weight above 6000.

6. A body of an unvulcanized tacky composition including a vulcanizable rubbery butadiene-1,3-styrene copolymer and a vulcanizing agent therefor, said body having a continuous layer free from surface tackiness consisting of polyethylene having a molecular weight above 6000 disposed over substantially the extent of the surface thereof, said layer being maintained on said surface by the tackiness of said composition.

7. The method of preventing adhesion of adjacent surfaces of tacky vulcanizable compositions comprising vulcanizable natural rubber and a vulcanizing agent therefor, which method comprises interposing between said surfaces a continuous preformed film comprising polyethylene having a molecular weight above 6000.

8. The method of preventing adhesion of adjacent surfaces of tacky vulcanizable compositions comprising vulcanizable rubbery butadiene-1,3-styrene copolymer and a vulcanizing agent therefor, which method comprises interposing between said surfaces a continuous preformed film comprising polyethylene having a molecular weight above 6000.

WILLIAM D. CALVERT.

REFERENCES CITED

The following references are of record in the file of this patent:

UNITED STATES PATENTS

| Number | Name | Date |
|---|---|---|
| 1,611,400 | Andrews | Dec. 21, 1926 |
| 2,269,660 | Griffin | Jan. 13, 1942 |
| 2,391,986 | Leach | Jan. 1, 1946 |
| 2,395,419 | Mitchell | Feb. 26, 1946 |

FOREIGN PATENTS

| Number | Country | Date |
|---|---|---|
| 491,804 | Great Britain | Sept. 8, 1938 |

OTHER REFERENCES

Myers, "Modern Plastics," Aug., 1944, pp. 103–107, 174, 176.